United States Patent
Beutler et al.

[19]

[11] Patent Number: 6,079,437
[45] Date of Patent: Jun. 27, 2000

[54] DIAPHRAGM VALVE WITH FLOW CONTROL STEM AIR BLEED

[75] Inventors: Matthew G. Beutler, Temecula; Revis R. Hunter, Escondido, both of Calif.

[73] Assignee: Hunter Industries, Inc., San Maros, Calif.

[21] Appl. No.: 09/236,791

[22] Filed: Jan. 25, 1999

[51] Int. Cl.[7] .................................................. F16K 31/126
[52] U.S. Cl. ...................... 137/181; 251/30.02; 251/46; 251/60
[58] Field of Search ........................ 251/46, 60, 30.02, 251/30.05; 137/181, 197

[56] References Cited

U.S. PATENT DOCUMENTS

| | | | |
|---|---|---|---|
| 3,459,403 | 8/1969 | Royer | 137/513.5 |
| 3,967,808 | 7/1976 | Lieding | 251/46 |
| 4,105,186 | 8/1978 | Eby | 251/30.02 X |
| 4,180,236 | 12/1979 | Saarem et al. | 251/46 X |
| 4,206,901 | 6/1980 | Williams | 251/46 X |
| 4,505,450 | 3/1985 | Saarem et al. | 251/46 X |
| 4,603,832 | 8/1986 | Sjoquist | 251/46 X |
| 4,911,401 | 3/1990 | Holcomb et al. | 251/30.05 X |
| 5,213,124 | 5/1993 | Costa | 251/30.02 X |
| 5,261,447 | 11/1993 | Boticki | 137/513.5 X |
| 5,299,774 | 4/1994 | Arneson et al. | 251/30.02 X |
| 5,564,459 | 10/1996 | Dunne | 137/181 |
| 5,632,465 | 5/1997 | Cordua | 251/46 |
| 5,853,026 | 12/1998 | Wlodarczyk et al. | 251/46 X |

*Primary Examiner*—Stephen M. Hepperle
*Assistant Examiner*—John Bastianelli
*Attorney, Agent, or Firm*—Michael H. Jester

[57] ABSTRACT

A diaphragm valve includes a valve housing, a diaphragm assembly mounted within the valve housing, a pilot valve coupled to the valve housing and a flow control stem mounted in an upper bonnet of the valve housing. The valve housing has an inlet passage and an outlet passage. The diaphragm assembly is vertically reciprocable back and forth within the valve housing to thereby connect and disconnect the inlet passage and the outlet passage. The valve housing has a lower inlet chamber below the diaphragm assembly, an upper pressure control chamber above the diaphragm assembly, and a bore in the bonnet which communicates with the upper pressure control chamber. The pilot valve is operatively associated with the upper pressure control chamber for selectively venting pressurized liquid therefrom. The diaphragm assembly normally seals the inlet passage from the outlet passage and is upwardly moveable to connect the inlet passage with the outlet passage upon release of a sufficient amount of pressurized water from the upper pressure control chamber via the pilot valve. The diaphragm assembly includes a mechanism for metering water from the lower inlet chamber through the diaphragm assembly into the upper pressure control chamber. The flow control stem is vertically reciprocable in the bore of the bonnet for selectively venting air trapped in the upper pressure control chamber.

20 Claims, 3 Drawing Sheets

DIAPHRAGM VALVE WITH FLOW CONTROL STEM AIR BLEED

BACKGROUND OF THE INVENTION

The present invention relates to irrigation systems, and more particularly, to an improved diaphragm flow control valve which can more conveniently and completely vent trapped air from the region above the diaphragm and below the bonnet.

The use of valve controlled pressurized irrigation systems for supplying water for the irrigation of plants is extensive throughout the world today. One of the most prevalent systems, particularly for lawn areas and athletic fields, includes a plurality of sprinklers positioned for distributing water over the surface of a land area. One or more control valves connect and disconnect water from a pressurized main supply line to branch lines each typically having several sprinklers connected thereto.

Pressure responsive and pressure regulating valves used in irrigation systems typically have a main diaphragm valve that is normally pilot operated. Upstream or inlet water pressure passes via a small metering orifice to the back side of a moveable diaphragm to apply valve closing pressure. The water is vented from the back side of the diaphragm via a small pilot valve passage controlled by a solenoid operated pilot valve to the main outlet passage of the valve. Hydraulically actuated diaphragm valves also vent water pressure from the downstream side of the diaphragm, without the need for a solenoid.

In diaphragm flow control valves it is not uncommon for excess air to become trapped between the upper side of the diaphragm and the bonnet, i.e. the upper generally hemispherical part of the main valve housing. The bonnet is also sometimes referred to as the upper clam shell. The inlet to the pilot valve passage is located too low to vent the trapped air. This trapped air can cause erratic behavior of the valve during its opening and closing cycles. If too much air accumulates between the uppers side of the diaphragm and the bonnet the valve can close too quickly, causing a water hammer effect that can damage downstream fittings and cause leaks.

In an effort to overcome this problem, diaphragm valves have been commercially produced with needle valves mounted in the bonnet. These valves can be manually opened to bleed air from between the diaphragm and the bonnet. However, since the needle valve is not located at the highest part of the bonnet but instead roughly halfway between the peak and its peripheral side edge, not all the trapped air can be released in this fashion. In addition, needle valves are relatively expensive and can rust, break and/or clog.

Accordingly, there is a need for a diaphragm flow control valve which can more conveniently and completely vent trapped air from the region above the diaphragm and below the bonnet.

SUMMARY OF THE INVENTION

Accordingly, it is the primary object of the present invention to provide an improved diaphragm valve constructed to conveniently and completely vent trapped air from the region above the diaphragm and below the bonnet.

It is another object of the present invention to provide an improved method of bleeding air from the upper pressure control chamber of a diaphragm valve to ensure optimum performance of the valve.

In accordance with the present invention a diaphragm valve comprises a valve housing, a diaphragm assembly mounted within the valve housing, a pilot valve coupled to the valve housing and a flow control stem mounted in an upper bonnet of the valve housing. The valve housing has an inlet passage and an outlet passage. The diaphragm assembly is vertically reciprocable back and forth within the valve housing to thereby connect and disconnect the inlet passage and the outlet passage. The valve housing has a lower inlet chamber below the diaphragm assembly, an upper pressure control chamber above the diaphragm assembly, and a bore in the bonnet which communicates with the upper pressure control chamber. The pilot valve is operatively associated with the upper pressure control chamber for selectively venting pressurized liquid therefrom. The diaphragm assembly normally seals the inlet passage from the outlet passage and is upwardly moveable to connect the inlet passage with the outlet passage upon release of a sufficient amount of pressurized liquid from the upper pressure control chamber via the pilot valve. The diaphragm assembly includes a mechanism for metering water from the lower inlet chamber through the diaphragm assembly into the upper pressure control chamber. The flow control stem is manually vertically reciprocable in the bore of the bonnet for selectively venting air trapped in the upper pressure control chamber.

In accordance with the present invention a method is also provided for bleeding air from a diaphragm valve to ensure optimum performance thereof A valve housing is provided with a dome-shaped bonnet and a base section. The base section has an inlet port and an outlet port. The bonnet has a neck in an upper central region thereof defining a bore. A diaphragm assembly is mounted inside the valve housing to define a lower inlet chamber and an upper pressure control chamber that communicates with the bore. The diaphragm assembly is moveable vertically to seal and unseal a liquid flow path between the inlet port and the outlet port and includes a metering body for permitting liquid to gradually flow from the lower inlet chamber through the diaphragm assembly to the upper pressure control chamber. A pilot valve is coupled to the upper pressure control chamber. A flow control stem is mounted in the bore so that it is moveable from an extended position in which it seals the bore to a retracted position in which air trapped in the upper pressure control chamber can be bled out through the bore. The flow control stem is momentarily depressed to move the stem to its retracted position to allow trapped air to escape through the bore.

BRIEF DESCRIPTION OF THE DRAWINGS

The above and other objects and advantages of the present invention will become apparent from the following description when read in conjunction with the drawings in which.

DETAILED DESCRIPTION OF THE PREFERRED EMBODIMENT

Figure 1:
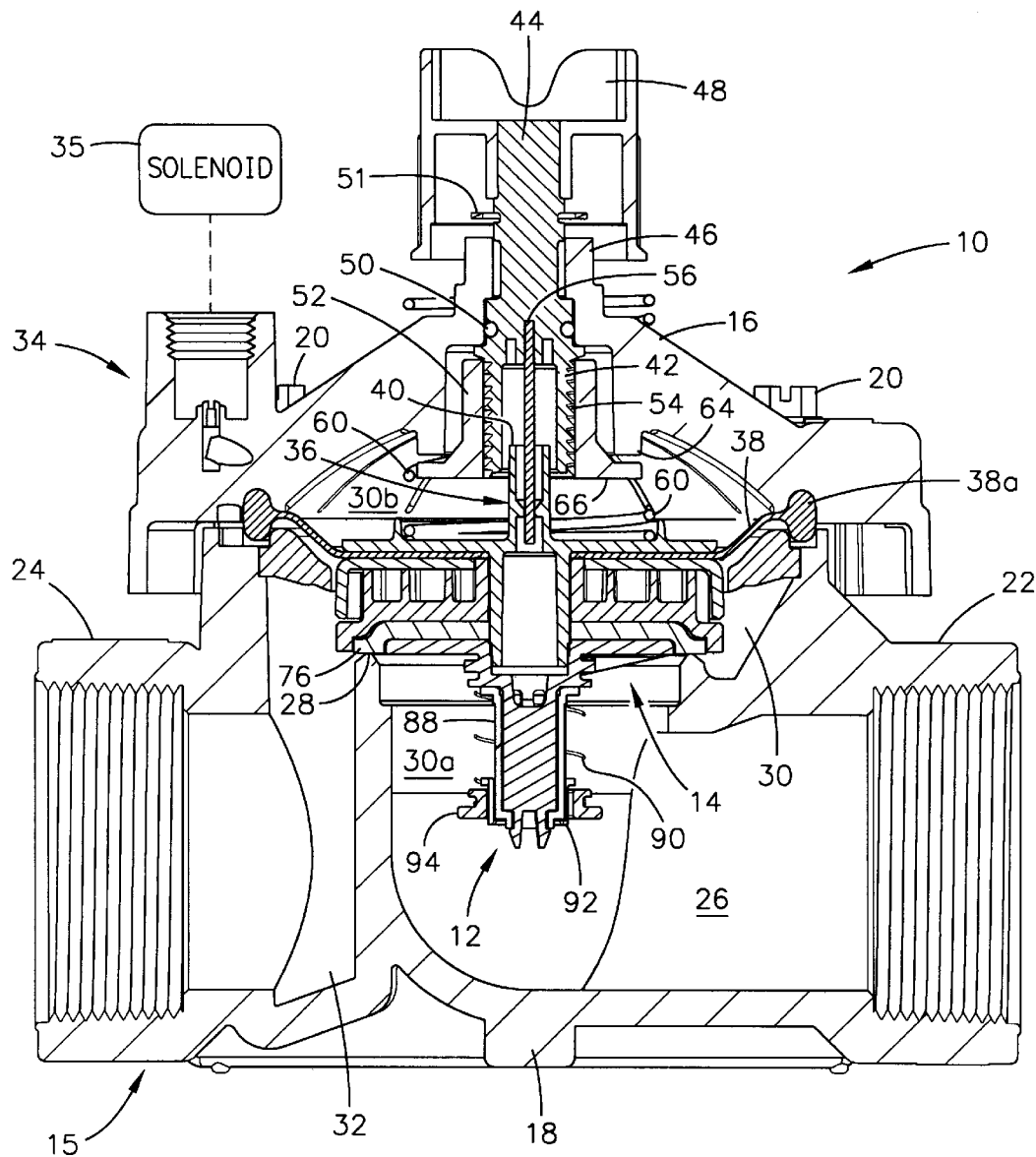
FIG. 1 is a vertical sectional view of a solenoid actuated diaphragm valve.

Referring to FIG. 1, the construction of a diaphragm valve 10 is illustrated in detail. Except for the addition of a built-in filter assembly 12, and a modified diaphragm assembly 14 designed to accommodate the filter assembly 12, the construction and operation of the valve 10 is similar to conventional diaphragm-type flow valves. The particular diaphragm valve illustrated in FIG. 1 is disclosed in co-pending U.S. patent application Ser. No. 09/127,017 filed Jul. 31, 1998 of Richard E. Hunter and Revis R. Hunter entitled DIPHRAGM VALVE WITH FILTER SCREEN AND MOVABLE WIPER ELEMENT. Said co-pending application of Richard E. Hunter and Revis R. Hunter is assigned to Hunter Industries, Inc., of San Marcos, Calif., the assignee of the present application. The entire disclosure of said U.S. patent application Ser. No. 09/127,017 is specifically incorporated herein by reference.

The diaphragm valve 10 is particularly suited for use in irrigation systems. Unless otherwise indicated, its parts are preferably made of injection molded plastic so that it is durable and inexpensive to manufacture and assemble. The diaphragm valve 10 includes an outer valve clam shell housing 15 made of an upper dome-shaped bonnet 16 and a lower base section 18. The bonnet 16 and base section 18 are removably held together with metal screws 20. The base section 18 has a female threaded inlet port 22 for connection to threaded pipe or fitting (not illustrated) that is in turn connected to a pressurized source of irrigation water. The lower base section 18 also has a female threaded outlet port 24 for connection to another threaded pipe or fitting (not illustrated) of a branch line that feeds one or more sprinklers. The inlet and outlet ports 22 and 24 are aligned with each other. The lower base section 18 of the valve housing has a hollow inlet passage 26 that extends from the inlet port 20 and terminates at a primary circular valve seat 28. The valve seat 28 defines the lower part of a main hollow valve chamber 30 in which the diaphragm assembly 14 is mounted for vertical reciprocation.

The main valve chamber 30 communicates via a downstream hollow outlet passage 32 to the outlet port 24. The diaphragm assembly 14 engages and disengages the primary valve seat 28 to control the flow of water from the inlet passage 26 to the outlet passage 32. This is accomplished by moving the diaphragm assembly 14 up and down with a pilot valve 34 to open and close the valve 10. The pilot valve 34 is operated by an electrically energized solenoid shown schematically as a box 35.

The diaphragm assembly 14 divides the main valve chamber 30 into a lower inlet chamber 30a and an upper pressure control chamber 30b. In general, all of the components of the diaphragm assembly 14 hereafter described have a round cross-section which varies in radius moving up or down. The diaphragm assembly 14 includes a metering body 36 that overlies one side of a circular flexible membrane 38. The flexible membrane 38 is preferably made of an elastomeric material such as synthetic rubber. The outer annular periphery of the flexible membrane 38 has a bead 38a that is captured in conforming recesses molded in the upper bonnet 16 and the lower base section 18. The bead 38a is squeezed between the bonnet 16 and base section 18 when the screws 20 are tightened. This secures the diaphragm assembly 14 centrally in position inside the main valve chamber 30.

The metering body 36 includes an upper central cylindrical metering tube 40 that slides vertically within a cylindrical sleeve 42 formed on the lower end of a cylindrical flow control stem 44. The flow control stem 44 is rotatable inside a cylindrical bore formed by an upper cylindrical shoulder 46 located at the top of the dome-shaped bonnet 16 of the valve housing 15. A knob 48 is securely attached to the upper end of the flow control stem 44. The knob 48 is manually rotatable to adjust the flow rate of the valve 10 as described hereafter.

An elastomeric O-ring 50 is seated in a groove formed in the outer wall of the flow control stem 44 and engages the facing surfaces of the bonnet 16 to provide a water-tight seal. A metal e-clip 51 is seated in a groove in the flow control stem 44 and overlaps the upper end of the shoulder 46 to fix the axial position of the flow control stem 44. The outer surface of the sleeve 42 is threaded with male threads that engage complementary female threads on the inner surface of a cylindrical collar 52 to define a threaded joint 54.

A metering needle or rod 56 that is preferably made of metal has its upper end rigidly secured in the flow control stem 44. The rod 56 extends co-axially through the center of the cylindrical sleeve 42. The lower end of the metering rod 56 extends through a small venturi-shaped metering orifice (not visible in FIG. 1) that is formed in the lower end of the metering tube 40.

A large metal coil spring 60 is compressed between the central horizontally extending disk portion of the metering body 36 and the underside of the dome-shaped bonnet 16 of the valve housing 15. An annular shoulder on the disk portion retains the lower end of the coil spring 60. The upper end of the coil spring 60 surrounds a downwardly facing shoulder 64 formed on the underside of the bonnet 16.

The knob 48 can be manually rotated to adjust the limit of vertical movement of the diaphragm assembly 14 which in turn determines the maximum flow rate of the valve 10 for a given water pressure. Rotation of the knob 48 also moves the metering rod 56 up and down through the metering orifice. Preferably there is only a relatively small clearance between the exterior surface of the metering rod 56 and the interior surfaces of the tube 40 that form the metering orifice. This permits a minute gradual flow of water from the lower inlet chamber 30a to the upper pressure control chamber 30b. The rod 56 is typically only withdrawn from the metering orifice during disassembly of the valve 10.

But for the inclusion of the filter assembly 12, dirt and other debris could clog the very small space between the metering rod 56 and the walls of the metering orifice in the tube 40. This would adversely affect the operation of the valve 10. Similarly, without the filter assembly 12, dirt and other debris could clog the small passages in the pilot valve 34 and/or impair the operation of the solenoid 35. The function of the filter assembly 12 is to remove this dirt and debris.

Manual rotation of the knob 48 also moves the collar 52 (FIG. 1) upward or downward. The flat underside 66 of the collar 52 can engage the upper side of the disk portion of the metering body 36. The collar 52 (FIG. 1) thus provides a variable height stop that limits the vertical movement of the diaphragm assembly 14. As the pilot valve 34 allows water pressure to bleed off from the upper control chamber 30b, the diaphragm assembly 14 moves upwardly, compressing the coil spring 60 Water from the lower inlet chamber 30a can then flow directly from the inlet passage 26 into the outlet passage 32. The height of the collar 52, which is adjustable via the knob 48, determines the size of the gap between the valve seat 28 and the underside of the periphery of the diaphragm assembly 14. The size of this gap in turn determines the flow rate through the valve 10 for a given water pressure.

The pressure control chamber 30b is located above the diaphragm valve assembly 14. As illustrated in FIG. 1, the valve is in its OFF configuration, since an elastomeric seal 76 of the diaphragm assembly 14 is in contact with the primary valve seat 28. The area above the diaphragm assembly 14, which is affected by the pressure in the pressure control chamber 30b, is greater than the area below the diaphragm assembly 14, which is affected by the pressure in the lower inlet chamber 30a. Pressurized water from the inlet 26 flows slowly through the diaphragm assembly 14 to the upper control chamber 30b to force the diaphragm assembly 14 downwardly. The coil spring 60 also puts a downward bias force on the diaphragm assembly 14. As a consequence, there is a combined downward force on the diaphragm assembly 14 which presses the seal 76 against the valve seat 28 The valve 10 is then in its closed or OFF configuration and no water can flow directly from the inlet passage 26 to the outlet passage 32.

Pressurized water can be vented from upper pressure control chamber 30b via the pilot valve 34 as is well known in the art. The pilot valve 34 is opened and closed by the solenoid 35 to allow water from a pilot valve passage (not illustrated) to enter the outlet passage 32. This relieving of pressure enables pressurized water in the lower inlet chamber 30a to force the diaphragm assembly 14 upwardly, lifting the seal 76 from the primary valve seat 28. This opens the valve 10 to its ON configuration, allowing water to flow directly between the inlet passage 26 and the outlet passage 32.

The flexible membrane 38 of the diaphragm assembly 14 operates as a sort of circular hinge that allows the central portion of the diaphragm assembly 14 to reciprocate up and down. The membrane 38 also operates as a seal in that it prevents water from entering the upper pressure control chamber 30b except through the center of the diaphragm assembly via the metering orifice in the tube 40. The membrane 38 also prevents water from leaving the upper pressure control chamber 30b except through a passage (not illustrated) connecting the upper pressure control chamber 30b to the pilot valve 34.

Closing of the pilot valve 34 enables build up of pressure in upper pressure control chamber 30b and downward motion of the diaphragm assembly 14 until the seal 76 re-engages the primary valve seat 28. This prevents water from flowing directly between the inlet and outlet passages 26 and 32, resulting in the closing of the valve 10 As already explained, the knob 48 can be rotated to set the upper limit of movement of the diaphragm assembly 14 and set the maximum flow rate through the valve 10 for a given water pressure.

When the solenoid 35 is energized by an electrical signal from an irrigation controller (not shown) carried on a wire (not shown), water is vented from the upper pressure control chamber 30b. This permits water to flow out of the pressure control chamber 30b and then to the outlet passage 32. As a result, pressure in the chamber 30b will decrease enough so that the pressure inside the lower inlet chamber 30a is higher by an amount sufficient to raise the seal 76 off the valve seat 28 This allows water to flow from the inlet passage 26 past valve seat 28 and directly into the outlet passage 32. When the solenoid 35 is de-energized, the force of the spring 60 and the build-up of water pressure inside the pressure control chamber 30b push the diaphragm assembly 14 downwardly, pushing the seal 76 into engagement with the valve seat 28 to close the valve 10.

When the diaphragm assembly 14 is moving upwardly to open the valve 10, the water that flows from the inlet passage 26 to the outlet passage 32 acts against a wiper element carrier 94, causing it to gradually rise upwardly relative to a cylindrical stainless steel filter screen 88. The force of the water is sufficient to overcome the force of the lightweight coil spring 90 which is then gradually compressed. During the movement of the wiper element carrier 94, a plurality of individual, circumferentially spaced scrubber elements (not visible) of a wiper element 92 engage and slide along the surface of the filter screen 88. The wiper element 92 is supported by the wiper element carrier 94. The wiper element 92 scours the surface of the filter screen 88 to remove microscopic mineral particles and algae that would otherwise build up on the filter screen 88. Over time this build-up can cause premature failure of the valve 10. The turbulence of the water flowing past the wiper element carrier 94 causes it to rattle or oscillate back and forth as it moves up the filter screen 88. This causes the individual scrubber elements to vibrate against the filter screen 88, thus improving the scouring action. The gaps between the individual scrubber elements also permit debris to flow away, through the outlet passage 32.

When the valve 10 is closed, the diaphragm assembly 14 descends to its lowermost position, shutting off the flow of water between the inlet and outlet passages 26 and 32. The absence of the force of flowing water against the wiper element carrier 94 causes the coil spring 90 to push the wiper element carrier 94 back to its lowermost position. Thus scouring action of the self-cleaning filter assembly 12 also occurs during the downward travel of the wiper element 92 past the outer surface of the filter screen 88. Preferably the wiper element 92 is dimensioned so that the inner edges of the individual scrubber elements firmly engage the filter screen 88 without undue deformation of the same. This will ensure efficient removal of deposited solids such as minerals and algae, as well as the dislodging of any dirt particles adhered to the surface of the filter screen 88. The filter screen 88 also prevents particles of dirt and debris from clogging the small space between the metering rod 56 and the walls of the metering orifice 58 and the small passages in the pilot valve 34. The filter screen 88 also prevents this debris from fouling the operation of the solenoid 35.

Figure 2:
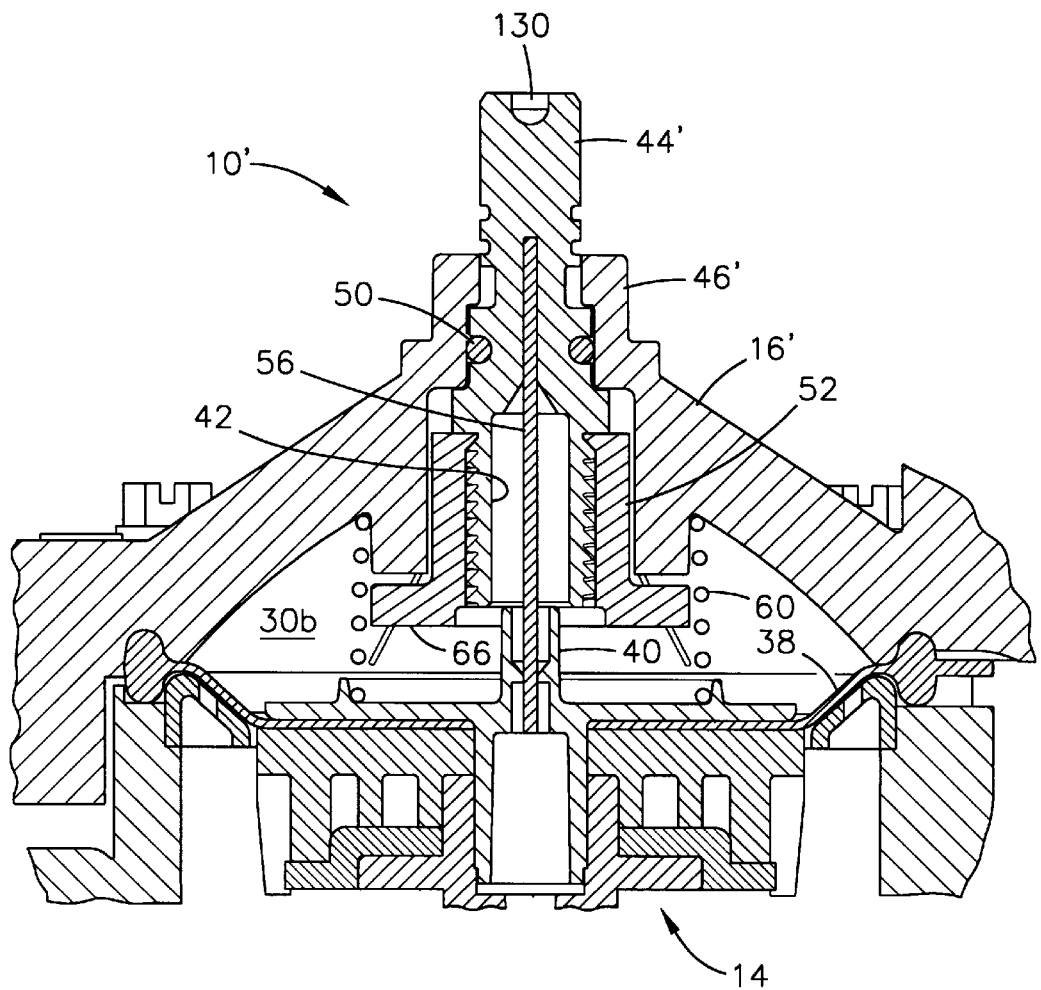
FIG. 2 is an enlarged vertical sectional view of a portion of a diaphragm valve configured to permit air bleed by momentarily depressing the flow control stem in accordance with a preferred embodiment of the present invention.
Figure 3:
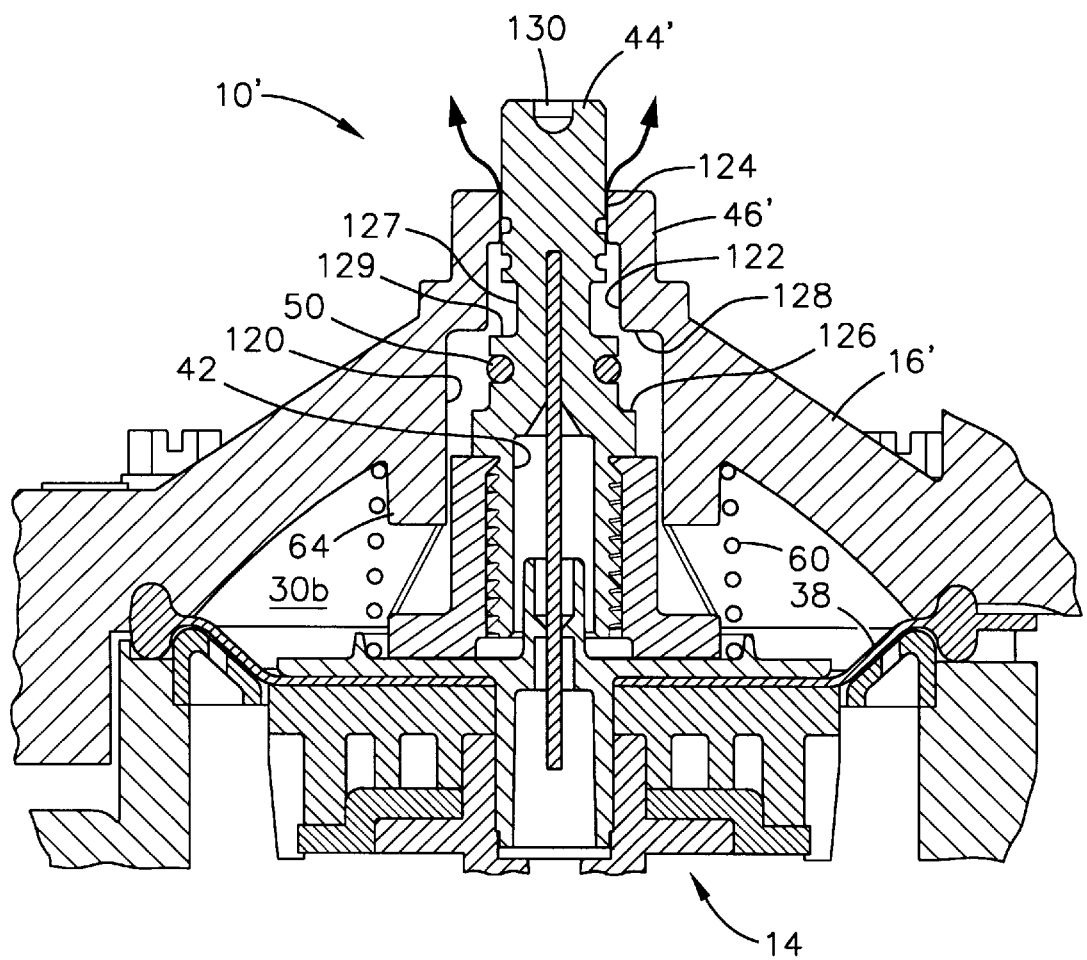
FIG. 3 is a view similar to FIG. 2 except that the flow control stem has been depressed to bleed off air from the region between the diaphragm assembly and the bonnet of the valve.

FIG. 2 shows a modified diaphragm valve 10' that is similar in all respects to the valve 10 of FIG. 1 except that the bonnet 16' of the former and its flow control stem 44' have been modified as hereafter explained. These modifications permit air trapped between the upper side of the diaphragm assembly 14 and the underside of the modified bonnet 16' to be easily and completely vented. This is accomplished by manually pressing downwardly on the top end of the modified flow control stem 44' to move it to from its extended position shown in FIG. 2 to its retracted position shown in FIG. 3. As best seen in FIG. 3, the bonnet 16' has a bore formed in the central highest portion thereof by central neck 46' that includes a series of inwardly facing cylindrical walls 120, 122 and 124 of progressively smaller inner diameters moving in an upward direction. The flow control stem 44' has a substantially uniform outer diameter along its length except for a series of grooves formed therein. The O-ring 50 is seated in the lowest one of the grooves formed in the flow control stem 44'. An upwardly facing shoulder 126 (FIG. 3) formed on the flow control stem 44' engages a downwardly facing shoulder 128 of the bonnet 16' when the flow control stem is in its uppermost fully extended position illustrated in FIG. 2. In this configuration, the O-ring 50 is compressed between the flow control stem 44' and the intermediate cylindrical wall 122. This provides a water-tight seal preventing any water from within the upper pressure control chamber 30b from escaping through the central bore in the bonnet 16' that receives and supports the flow control stem 44'. It will be understood that the opening and closing of the valve 10' is controlled via the solenoid operated pilot valve 34 that normally controls the escape of water from the upper pressure control chamber 30*b*.

When the flow control stem 44' is manually pushed downwardly to its lower retracted position illustrated in FIG. 3 the O-ring 50 and an upwardly facing shoulder 129 on the flow control stem 44' are positioned below the shoulder 128 of the bonnet 16'. This allows air trapped inside the upper pressure control chamber 30*b* to escape around the upper portion of the flow control stem 44' outside of the bonnet 16' as indicated by the arrows in FIG. 3. The trapped air is normally located at the top of the pressure control chamber 30*b* so venting through the bore formed by the central neck 46' is highly advantageous. The venting of the air may be heard as a slight hissing sound. As soon as water squirts out from the neck 46' the maintenance person can stop pushing downwardly on the flow control stem 44'. The pressure of the water acting on the underside 66 of the collar 52 inside the upper pressure control chamber 30*b* pushes the flow control stem 44' back to its fully extended position shown in FIG. 2 once the maintenance person stops pushing downwardly on the stem 44'. Thus a momentary pressing downward on the flow control stem 44' with the person's thumb is all that is required to "burp" our valve 10'.

The length of the flow control stem 44', the positioning of the O-ring 50 and the dimensions of the cylindrical walls 120, 122 and 124 of the neck 46' are proportioned so that a seal is achieved when the stem 44' is fully extended and so that venting of air is achieved by a relatively small downward travel of the stem 44'. It is necessary for the O-ring 50 to travel below the intermediate cylindrical wall 122 to break the seal that otherwise exists. A preferred range of travel is approximately one-eighth of an inch. A large groove 127 in the flow control stem 44' allows the air to rapidly enter the space between the outer surface of the flow control stem 44' and the cylindrical wall 122. The air then travels through the very slight space or gap between the outer surface of the flow control stem 44' and the smallest cylindrical wall 124. It is desirable to minimize the size of this gap so that an undue amount of water does not spray out of the valve housing during the burping process. The sleeve 42 at the lower end of the flow control stem 44' has male threads that mate with female threads on the inside of the collar 52. Twisting of the upper end of the flow control stem 44' thus allows the height of the collar 52 to be adjusted. The collar 52 serves as an adjustable stop that limits the upward travel of the diaphragm assembly 14 and thus determines the flow rate of the valve 10' for a given water pressure at the inlet port 22. Splines, a rib, a key or some other means (not illustrated) may be employed to permit vertical reciprocation, but not rotation, of the collar 52. This ensures that twisting of the flow control stem will raise and lower the collar 52. If desired an e-clip (not shown) can be used on the stem 44' to limit the downward travel.

Instead of the knob 48 (FIG. 1), the valve 10' of FIGS. 2 and 3 has a slot or recess 130 formed in the upper end of the flow control stem 44'. The slot 130 receives a tool (not illustrated) for twisting the stem 44' to adjust the flow rate of the valve 10'. The unique construction of our diaphragm valve 10' thus provides a very convenient way to easily and completely vent or bleed air from the upper bonnet 16' of the valve 10' to ensure proper operation thereof. Our invention utilizes a moveable flow control stem that moves between sealed and unsealed positions to bleed off air trapped between the diaphragm and the upper section of the valve housing, within the upper pressure control chamber. Clearly our invention is adaptable to a wide variety of diaphragm valve configurations. We have not only provided a novel diaphragm valve construction, but in addition, a novel method of bleeding off or "burping" air from a diaphragm-type valve to ensure its optimum performance.

While we have illustrated and described our diaphragm valve with flow control stem air bleed by means of a specific embodiment, it should be understood that numerous changes and modifications may be made therein without departing from the spirit and scope of the invention as defined in the appended claims. The valve can be used in other applications besides irrigation. While water is the most common liquid that is conveyed through a valve of this type, our valve may be used with other liquids in the food and chemical industries, for example. Therefore, the protection afforded our invention should only be limited in accordance with the following claims.

We claim:

1. A diaphragm valve, comprising:

a valve housing having an inlet passage, an outlet passage, a primary valve seat between the inlet passage and the outlet passage, a lower inlet chamber below the primary valve seat, an upper pressure control chamber above the primary valve seat, and a neck forming a bore that communicates with the upper pressure control chamber;

a pilot valve operatively associated with the upper pressure control chamber for selectively venting pressurized water therefrom;

a diaphragm assembly mounted inside the valve housing and having a seal normally engaged with the primary valve seat to seal the inlet passage from the outlet passage, the diaphragm assembly being moveable in a first direction to disengage the seal from the primary valve seat upon release of a sufficient amount of pressurized water from the upper pressure control chamber, the diaphragm assembly including means for metering water from the lower inlet chamber through the diaphragm assembly into the upper pressure control chamber; and a flow control stem extending from an upper side of the diaphragm assembly and through the bore, the flow control stem being moveable from an extended position in which it seals the bore to a retracted position in which air trapped in the upper pressure control chamber can be bled out through the bore.

2. A diaphragm valve according to claim 1 and further comprising elastomeric means surrounding the flow control stem for sealing a space between the flow control stem and a wall of the bore when the flow control stem is in its extended position.

3. A diaphragm valve according to claim 2 wherein the elastomeric means is an O-ring.

4. A diaphragm valve according to claim 1 wherein the neck has a plurality of inwardly facing cylindrical walls having progressively smaller diameters.

5. A diaphragm valve according to claim 1 and further comprising a collar threaded over a lower end of the flow control stem and moveable upwardly and downwardly by twisting the flow control stem to provide a variable height stop for limiting the degree of upward travel of the diaphragm assembly.

6. A diaphragm valve according to claim 5 wherein the flow control stem has a slot in an upper end thereof for receiving a tool for twisting the flow control stem.

7. A diaphragm valve according to claim 1 wherein the flow control stem has a metering rod that ends downwardly therefrom and cooperates with the metering means of the diaphragm assembly.

8. A diaphragm valve according to claim 1 wherein the lower end of the flow control stem includes a cylindrical sleeve.

9. A diaphragm valve according to claim 8 and further comprising a collar surrounding the sleeve.

10. A diaphragm valve according to claim 9 wherein the sleeve and collar having mating threads so that twisting of the upper end of the flow control stem will move the collar upwardly and downwardly relative to the diaphragm assembly.

11. A valve, comprising:

a diaphragm assembly;

a valve housing having an inlet passage and an outlet passage, the diaphragm assembly being reciprocable back and forth within the valve housing to thereby connect and disconnect the inlet passage and the outlet passage, the valve housing having a lower inlet chamber below the diaphragm assembly, an upper pressure control chamber above the diaphragm assembly, and a bore communicating with the upper pressure control chamber;

a pilot valve operatively associated with the upper pressure control chamber for selectively venting pressurized water therefrom;

the diaphragm assembly normally sealing the inlet passage from the outlet passage and being moveable in a first direction to connect the inlet passage with the outlet passage upon release of a sufficient amount of pressurized water from the upper pressure control chamber via the pilot valve;

the diaphragm assembly including means for metering water from the lower inlet chamber through the diaphragm assembly into the upper pressure control chamber; and means connected to the diaphragm assembly for selectively venting air trapped in the upper pressure control chamber including a flow control stem vertically reciprocable in the bore of the valve housing.

12. A diaphragm valve according to claim 11 wherein the means for selectively venting air trapped in the upper pressure control chamber includes a flow control stem extending through the bore, the flow control stem being moveable from an extended position in which it seals the bore to a retracted position in which air trapped in the upper pressure control chamber can be bled out through the bore.

13. A diaphragm valve according to claim 12 and further comprising elastomeric means surrounding the flow control stem for sealing a space between the flow control stem and a wall of the bore when the flow control stem is in its extended position.

14. A diaphragm valve according to claim 13 wherein the elastomeric means is an O-ring.

15. A diaphragm valve according to claim 11 wherein the housing has a neck that defines the bore, the neck having a plurality of inwardly facing cylindrical walls having progressively smaller diameters.

16. A diaphragm valve according to claim 12 and further comprising a collar threaded over a lower end of the flow control stem and moveable upwardly and downwardly by twisting the flow control stem to provide a variable height stop for limiting the degree of upward travel of the diaphragm assembly.

17. A diaphragm valve according to claim 12 wherein the flow control stem has a metering rod that ends downwardly therefrom and cooperates with the metering means of the diaphragm assembly.

18. A diaphragm valve according to claim 12 wherein the lower end of the flow control stem includes a cylindrical sleeve.

19. A diaphragm valve according to claim 18 and further comprising a collar surrounding the sleeve, and further wherein the sleeve and collar having mating threads so that twisting of the upper end of the flow control stem will move the collar upwardly and downwardly relative to the diaphragm assembly.

20. A method of bleeding air from a diaphragm valve to ensure optimum operation thereof, comprising the steps of:

providing a valve housing with a bonnet and a base section, the base section having an inlet port and an outlet port, and the bonnet having a neck in an upper central region thereof defining a bore;

mounting a diaphragm assembly inside the valve housing to define a lower inlet chamber and an upper pressure control chamber that communicates with the bore, the diaphragm assembly being moveable vertically to seal and unseal a liquid flow path between the inlet port and the outlet port and including a metering body for permitting liquid to gradually flow from the lower inlet chamber through the diaphragm assembly to the upper pressure control chamber;

coupling a pilot valve to the upper pressure control chamber;

mounting a flow control stem in the bore, the flow control stem being connected to the diaphragm assembly and being moveable from an upper extended position in which it seals the bore to a lower retracted position in which air trapped in the upper pressure control chamber can be bled out through the bore; and momentarily depressing the flow control stem to move the stem to its lower retracted position to allow trapped air to escape through the bore.

* * * * *